United States Patent [19]

Matsuda et al.

[11] 4,008,196
[45] Feb. 15, 1977

[54] PROCESS FOR PREPARATION OF AMPHOTERIC RESINOUS AQUEOUS EMULSIONS

[75] Inventors: Kazuo Matsuda; Hidemasa Ohmura, both of Wakayama; Yukihisa Niimi, Osaka, all of Japan

[73] Assignee: Kao Soap Co., Ltd., Tokyo, Japan

[22] Filed: Aug. 15, 1975

[21] Appl. No.: 605,018

[30] Foreign Application Priority Data

Aug. 20, 1974 Japan .............................. 49-95236

[52] U.S. Cl. .......................... 260/29.2 TN; 8/194; 260/77.5 AM
[51] Int. Cl.² ................. C08G 18/71; D06M 15/52
[58] Field of Search ............ 260/29.2 TN, 77.5 AM

[56] References Cited

UNITED STATES PATENTS

| | | | |
|---|---|---|---|
| 3,836,493 | 9/1974 | Matsuda et al. | 260/29.2 TN |
| 3,903,031 | 9/1975 | Matsuda et al. | 260/29.2 TN |
| 3,903,032 | 9/1975 | Matsuda et al. | 260/29.2 TN |
| 3,928,271 | 12/1975 | Matsuda et al. | 260/29.2 TN |
| 3,951,897 | 4/1976 | Matsuda et al. | 260/29.2 TN |

Primary Examiner—Murray Tillman
Assistant Examiner—A. H. Koeckert
Attorney, Agent, or Firm—Woodhams, Blanchard and Flynn

[57] ABSTRACT

A process for the preparation of amphoteric resinous aqueous emulsions useful for the treatment of fiber-containing products, comprising reacting an isocyanate-terminated urethane prepolymer with an excess of a polyalkylene polyamine to form a polyurethane-urea-polyamine, then partially reacting the amino groups in the polyurethane-urea-polyamine with a compound selected from the group consisting of alkyl isocyanates in which the alkyl group has 12 to 22 carbon atoms and alpha-olefin epoxides having 12 to 22 carbon atoms, thereby to introduce a long-chain alkyl group into the molecule, reacting the thus-formed product having some unreacted amino groups with a member selected from the group consisting of 1,3-propanesultone, 1,4-butanesultone, β-propiolactone, ε-caprolactone and δ-valerolactone, thereby to render the polymer amphoteric, and mixing the resulting polymer with water.

10 Claims, No Drawings

PROCESS FOR PREPARATION OF AMPHOTERIC RESINOUS AQUEOUS EMULSIONS

BACKGROUND OF THE INVENTION

1. FIELD OF THE INVENTION

This invention relates to a process for the preparation of amphoteric resinous aqueous emulsions useful for the treatment of fiber-containing products.

2. DESCRIPTION OF THE PRIOR ART

It is well known that polyurethane resins have good elasticity, and they have heretofore been widely used in various fields as adhesives, binders for non-woven fabrics, resinous components for artificial leather products, and the like. In general, they are applied in the form of organic solvent solutions.

Ordinary fiber-treating agents such as softening agents, antistatic agents and resin processing agents are generally used in aqueous systems. Accordingly, when a polyurethane resin is to be used in combination with ordinary fiber-treating agents, it is preferred that the resin be water-soluble or that it be in the form of an aqueous emulsion.

Polyurethane resins are excellent in physical properties as elastomers, but because they contain in the molecule many hydrogen groups of carboamides, they have a large intermolecular cohesive force and the polyurethane resins are poorly soluble in non-polar solvents. Accordingly, it is very difficult to form aqueous emulsions of polyurethane resins.

It is known to prepare stable emulsions by reacting an isocyanate-terminated urethane prepolymer with an excess of a polyalkylene polyamine to form a polyurethane-urea-polyamine, and then rendering amphoteric the amino groups in the thus-formed polyurethane-urea-polyamine. The thus-formed emulsion gives a film of an excellent rubbery elasticity when dried, and it is effective as a binder for fibers, papers, leathers, woods and construction materials. However, it is insufficient in the softness which is a very important property for fibertreating agents.

SUMMARY OF THE INVENTION

We have discovered that when the above-mentioned polyurethane-urea-polyamine is partially reacted with a compound so as to introduce a long-chain alkyl group into the molecule, and then the remaining unreacted amino groups are rendered amphoteric, there is obtained an aqueous resin emulsion which can impart to fibers not only elasticity and crease resistance, but also a soft touch or feel and excellent washing fastness when the emulsion is used as a fiber-treating agent.

In accordance with this invention, there is provided a process for preparing amphoteric resin aqueous emulsions useful for the treatment of fiber-containing articles or products, which comprises reacting an isocyanate-terminated urethane prepolymer with an excess of a polyalkylene polyamine to form a polyurethane-urea-polyamine, then reacting a part of the amino groups in the polyurethane-urea-polyamine with a compound selected from the group consisting of alkyl isocyanates in which the alkyl group has 12 to 22 carbon atoms and alpha-olefin epoxides containing from 12 to 22 carbon atoms, thereby to introduce a long-chain alkyl group into the molecule, reacting the thus-formed product containing unreacted amino groups with a member selected from the group consisting of 1,3-propanesultone, 1,4-butanesultone, $\beta$-propiolactone, $\epsilon$-caprolactone and $\delta$-valerolactone, thereby to render the polymer amphoteric, and mixing the resulting polymer with water.

The polyurethane-urea-polyamine used in this invention is obtained by reacting an isocyanate-terminated urethane polymer, which is prepared from a polyhydroxyl compound and an excess of polyfunctional isocyanate, with a polyalkylene polyamine in a ketone type solvent.

As the polyfunctional isocyanate to be used as the starting material for the production of the urethane prepolymer, there are preferably employed aromatic, aliphatic and alicyclic diisocyanates such as 1,5-naphthylene diisocyanate, 4,4'-diphenylmethane diisocyanate, 4,4'-diphenyldimethylmethane diisocyanate, di- and tetra-alkyldiphenylmethane diisocyanates, 4,4'-dibenzylisocyanate, 1,3-phenylene diisocyanate, 1,4-phenylene diisocyanate, tolylene diisocyanate, chlorinated isocyanates, brominated isocyanates, phosphoruscontaining isocyanates, butane-1,4-diisocyanate, hexane-1,6-diisocyanate, dicyclohexylmethane diisocyanate, xylylene diisocyanate and the like.

The polyhydroxyl compound used for preparing the above urethane prepolymer is a compound having a molecular weight of 200 to 10,000. Known polyhydroxyl compounds generally used for the preparation of polyurethanes, such as polyethers, polyesters, polyester amides, polyacetals, polythioethers and polybutadiene glycols, can be used in this invention.

As the polyethers that can be employed as such polyhydroxyl compound, there can be mentioned, for example, homopolymers, copolymers and graft copolymers of tetrahydrofuran, ethylene oxide, propylene oxide, butylene oxide and the like. Further, there can be employed homogeneous or mixed polyethers formed by polymerization of hexane diol, methylhexane diol, heptane diol and octane diol. Still further, propoxylated and ethoxylated glycols can be used.

As the polythioethers that can be employed as such polyhydroxyl compound, there are preferably employed condensation products of thioglycols alone or with other glycols.

As the polyacetals, there can be mentioned water-soluble polyacetals formed from hexane diol and formaldehyde or from 4,4'-dihydroxyethoxydiphenyldimethyl methane and formaldehyde.

As typical examples of the polyesters, there can be mentioned polyester glycols obtained by dehydrating condensation of dibasic acids and saturated or unsaturated low-molecular weight glycols, such as ethylene glycol, propylene glycol, 1,3-butanediol, 1,4-butanediol, neopentyl glycol, pentanediol, hexanediol, octanediol, 2-ethyl-1,3-hexanediol, 1,4-butynediol, bisphenol A, diethylene glycol, dipropylene glycol and the like, and polyester glycols obtained by ring-opening polymerization of cyclic ester compounds.

If desired, ordinary glycols such as ethylene glycol, di- and tri-ethylene glycols, butane diol, propane diol, 1,6-hexane diol and neopentyl glycol can be used together with the above-mentioned polyols.

In this invention, as the polyalkylene polyamine, there can be used a variety of polyalkylene polyamines including polyethylene polyamine, polypropylene polyamine, polybutylene ployamine and the like. More specifically, the polyalkylene polyamine used in this invention is a polyamine in which nitrogen atoms are connected through groups of the formula $-C_nH_{2n}-$ in which n is an integer of at least 1, preferably from 2 to 6, and the number of such groups is between 2 and about 4. The nitrogen atoms can be bonded to the adjacent carbon atoms in the groups —$C_nH_{2n}$—, but two nitrogen atoms are not bonded to the same carbon atom. More specifically, not only polyamines such as diethylene triamine, triethylene tetraamine, tetraethylene pentaamine and dipropylene triamine, but also mixtures thereof and various purified polyamine materials may be used. Still further, hydroxyalkyl substituted polyamines can be used in combination with the foregoing polyamines.

The polyamines have the formula

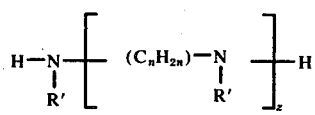

wherein $n$ is from 1 to 6, $z$ is 2 to 4, and $R'$, which can be the same or different, are hydrogen, alkyl having 1 to 4 carbon atoms or hydroxyalkyl having one to 4 carbon atoms.

In some cases, in order to change the density of hydrophilic groups in the resulting aqueous emulsion of this invention or to improve the properties of a film prepared from such an emulsion, it is preferred to change or increase the distance between adjacent active hydrogen-containing amino groups in the polyurethane-urea-polyamine molecule.

This can be accomplished by replacing a part of the polyalkylene polyamine by ethylene diamine, propylene diamine, hexamethylene diamine and an adduct of such diamine to an alkylene oxide, acrylonitrile or an acrylic acid ester. In this case, up to 80 molar % of the polyalkylene polyamine can be replaced by a molar equivalent of the diamine, but in general, up to 50 molar % of the polyalkylene polyamine is replaced for attaining the above purpose.

The preparation of the isocyanate-terminated urethane prepolymer is conducted in the presence of an inert solvent, such as benzene, or in the absence of a solvent. When an aromatic diisocyanate is reacted with the polyhydroxyl compound, a reaction temperature of 60° to 100° C is used. When an aliphatic or alicyclic diisocyanate is used, a reaction temperature of 100° to 130° C is employed.

In preparing the above urethane prepolymer, it is preferred that the amount of the diisocyanate be chosen so that all the OH groups of the polyhydroxyl compound capable of reacting with the isocyanate groups are completely reacted. More specifically, it is preferred that the mole ratio of the total number of the NCO groups to the total number of the reactive hydrogen atoms (OH groups) be within a range of from 1.1 to 1.0 to 5.0 : 1.0.

The reaction between the isocyanate-terminated urethane prepolymer and the polyalkylene polyamine is preferably conducted, in a ketone type solvent, under atmospheric pressure, at a temperature of from −20° C to +70° C. As the ketone type solvent, there can be used, for example, acetone, methylethyl ketone, diethyl ketone, dipropyl ketone, methylisobutyl ketone and methyl isopropyl ketone. In view of their industrial availability, the use of acetone and methylethyl ketone is preferred. Further, a mixture of such ketone type solvent with benzene, tetrahydrofuran, dioxane, an acetic acid ester, dimethyl formamide or a chlorinated solvent can be used.

The reaction time is determined by the reaction temperature and the reactivity of the isocyanate-terminated urethane prepolymer. A longer reaction time or a shorter reaction time can be used depending on reaction conditions. The reaction is continued until in the infrared absorption spectrum of the reaction product, the absorption at 2250 cm$^{-1}$ owing to the group —N=C=O disappears. In general, the reaction is completed in 0.5 to 2 hours.

In the reaction of the polyalkylene polyamine with the terminal isocyanate groups of the urethane prepolymer molecules, the reaction between the isocyanate group and the secondary amino group takes preference. It is critical that the total mole number of the primary and secondary amino groups in the polyalkylene polyamine should be greater than the total mole number of the isocyanate groups at both terminal ends of the urethane prepolymer. As the total number of moles of the amino groups becomes close to the total number of moles of the isocyanate groups, the molecular weight of the polyurethane- urea-polyamine increases, and the product is gelled or has a high tendency to gelation. When the ratio of the total mole number of the amino groups to the total mole number of the isocyanate groups is excessively high, a polyurethane-urea- polyamine of a low molecular weight is formed, and a resin having excellent physical properties cannot be prepared from such an intermediate.

The ratio of the number (B) of moles of active hydrogen-containing amino groups in the polyalkylene polyamine to the number (A) of isocyanate groups in the isocyanate-terminated urethane prepolymer is within the range of 1<B/A ≦ 5, especially 1<B/A ≦ 3.

It is preferred that the molecular weight of the polyurethane-urea-polyamine be in the range of 5,000 to 100,000.

The following method is adopted for introducing a long-chain alkyl group into the polyurethane-urea-polyamine. More specifically, the introduction is accomplished by reacting a part of the amino groups (primary and secondary amino groups) in the polyurethane-urea-polyamine molecule with a long-chain alkyl isocyanate (including an alkyl isocyanate derived from 1 mole of a long-chain alcohol and 1 mole of a diisocyanate) having an alkyl group of 12 to 22 carbon atoms or with an alpha-olefin epoxide having from 12 to 22 carbon atoms in the molecule.

As specific examples of alkyl isocyanates having an alkyl group of 12 to 22 carbon atoms that can be used in this invention, there can be mentioned dodecyl isocyanate, tetradecyl isocyanate, hexadecyl isocyanate, heptadecyl isocyanate, octadecyl isocyanate and mixtures of two or more of these isocyanates.

As examples of alpha-olefin epoxides having 12 to 22 carbon atoms, there can be mentioned dodecene oxide, tetradecene oxide, hexadecene oxide, octadecene oxide, eicosene oxide, docosene oxide and mixtures thereof.

The compound supplying the long-chain alkyl group is used in an amount of 10 to 80 mole %, preferably 20 to 60 mole %, based on the number of moles of amino groups (primary and secondary amino groups) in the polyurethane-urea-polyamine molecule. If the amount of the long-chain alkyl group is larger than 80 %, emulsification becomes difficult and when the amount of the long-chain alkyl group is smaller than 10 mole %, the fiber-softening effect of the emulsion is insufficient.

The reaction for introducing the long-chain alkyl group into the polyurethane-urea-polyamine is conducted in the same system as the system used for preparing the polyurethane-urea-polyamine, and it is carried out subsequently to the preparation of the polyurethane-urea-polyamine. After addition of the above-mentioned long-chain compound to the system containing the polyurethane-urea-polyamine, the reaction is conducted at 10° to 70° C for 1 to 5 hours under heating and agitation to effect the introduction of the long-chain alkyl group.

The introduction of the long-chain alkyl group into the polyurethane-urea-polyamine molecule can also be accomplished by reacting an isocyanate-terminated urethane prepolymer with a polyamine already having a long-chain alkyl group present therein. According to this method, however, it is difficult to obtain a product of high molecular weight. Accordingly, the desired introduction can be accomplished, with greater assurance of successful results, by the above-mentioned method employed in this invention in which a polyurethane-urea-polyamine is first formed and it is then reacted with a highly reactive group such as a long-chain isocyanate group or a long-chain epoxide group.

The thus-prepared long-chain alkyl group-containing polyurethane-urea-polyamine (1) is reacted with a lactone or a sultone, and the resulting reaction mixture is mixed with water. Then, the solvent used for the reaction is removed to form an amphoteric self-emulsified polyurethane emulsion that can be used stably within a wide pH range.

Further, the long-chain alkyl group-containing polyurethane-urea-polyamine (1) can be reacted with epichlorohydrin (or epibromohydrin) and then rendered amphoteric in the same manner as described above, to obtain a reactive (cross-linkable) urethane emulsion. In this regard, reference is made to U.S. Ser. No. 505 536, filed Sept. 13, 1974, the entire contents of which are incorporated herein by reference.

As the lactone to be used in this invention, there can be mentioned β-propiolactone, δ-valerolactone and ε-caprolactone, and as the sultone, there can be mentioned 1,3-prapanesultone and 1,4-butanesultone. In general, such lactone or sultone compound is reacted with compound (1) in an amount of 0.5 to 2.0 moles lactone or sultone per mole of the amino groups in compound (1), at 40° to 70° C for 1 to 7 hours.

In order to obtain a reactive (cross-linkable) urethane emulsion, the long-chain alkyl group-containing polyurethane-urea-polyamine compound (1) is reacted with epichlorohydrin (or epibromohydrin) in an amount equimolar to the primary and secondary amino groups in the molecule of compound (1), at 40° to 70° C for 2 to 5 hours, and the reaction mixture is then rendered amphoteric in the same manner as described above.

According to the foregoing process there are obtained amphoteric aqueous resin emulsions ordinarily having a resin content of 5 to 50 weight percent.

When the polyurethane emulsion prepared according to this invention is used for the treatment of fiber-containing products, it imparts to the fibrous products not only good elasticity and crease resistance, but also a soft touch. Further, when non-woven fabrics, papers, leathers, rubbers, woods, metals, glasses and plastics are treated with this polyurethane emulsion by dipping or surface coating or spraying, followed by drying, the effects of improved touch and physical properties are attained. The polyurethane emulsion of this invention can be used for treating construction materials and as adhesives. Furthermore, because the structure of the resinous component of the emulsion has the structure of a polymeric surface active agent, it is expected that the emulsion can be used not only as a binder but also as a surface active agent.

The polyurethane emulsion prepared according to this invention is a so-called self-emulsified emulsion, that is, it is free of an emulsifying agent. However, if it is desired to improve the stability of the emulsion, a known emulsifying agent can be added in such an amount as will not greatly change the properties of the polyurethane resin. Moreover, this emulsion can be used in combination with other resinous materials, provided that the mixed systems are stable.

This invention will now be further described in detail by reference to the following illustrative Examples.

In the Examples all references to "parts" and "percent" are on a weight basis unless otherwise indicated.

EXAMPLE 1

34.8 parts (0.2 mole) of an 80 : 20 mixture of 2,4-tolylene diisocyanate and 2,6-tolylene diisocyanate and 90 parts of benzene were added to 202 parts (0.1 mole) of dehydrated polytetramethylene ether glycol (having an OH value of 55.3), and the mixture was agitated at 80° C for 1 hour. Then, the mixture was allowed to cool in air to room temperature (18°–25° C) to obtain a solution of an isocyanate-terminated urethane prepolymer having an isocyanate content of 2.50%.

A four-neck flask was charged with 250 parts of methyl-ethyl ketone and 3.83 parts (0.037 mole) of diethylene triamine, and while the temperature of the charge was maintained below 10° C by external cooling with ice, 100 parts (0.030 mole) of the above prepolymer solution was gradually added dropwise to the charge of the flask over a period of 2 hours under agitation to obtain a polyurethane-urea-polyamine solution.

A minute amount of this polymer solution was taken as a sample, and the infrared absorption spectrum of the sample was examined. As a result, it was found that the absorption at 2250 cm$^{-1}$ owing to the isocyanate group was not present.

Then, 4.44 parts (0.015 mole) of octadecyl isocyanate was added under agitation to the above polyurethane-urea-polyamine solution, to cause a reaction therebetween. Then, 4.50 parts (0.037 mole) of 1,3-propanesultone was added to the reaction mixture and was reacted at a temperature of 50° C under vigorous agitation for 2 hours. Then, 600 parts of water was added to the reaction mixture. The solvent was removed at 60° C under reduced pressure, and water was added to the residue to adjust the concentration.

Thus, there was obtained a stable low-viscosity aqueous emulsion having a resin content of 10%.

EXAMPLE 2

Instead of the octadecyl isocyanate used in Example 1, there was used 3.90 parts (0.015 mole) of NEDOX 1518 OLEFIN OXIDE (ADM Chemicals, Ashland Oil & Refining Co.) (alphaolefin epoxide having 15 to 18 carbon atoms on the average) which was added to the polyurethane-urea-polyamine solution prepared in Example 1. The reaction was conducted at 50° C for 3 hours. Then, 6.35 parts (0.052 mole) of 1,3-propanesultone was added and reacted under vigorous agitation at 50° C for 2 hours to render amphoteric the remaining amino groups. Then, 600 parts of water was added to the reaction mixture and the solvent was removed at 60° C under reduced pressure. Water was added to the residue to adjust the concentration. Thus, there was obtained a low-viscosity stable aqueous emulsion having a resin content of 10%.

COMPARATIVE EXAMPLE 1

The polyurethane-urea-polyamine solution obtained in Example 1 was directly reacted with 6.35 parts (0.052 mole) of 1,3-propanesultone, without reaction with octadecyl isocyanate as employed in Example 1, and the reaction was carried out at 50° C for 2 hours to render the remaining amino groups amphoteric. Then, 600 parts of water was added to the reaction mixture. The solvent was removed at 60° C under reduced pressure and water was added to the residue to adjust the concentration. Thus, there was obtained a low viscosity stable aqueous emulsion having a resin content of 10%.

EXAMPLE 3

Following the procedure of Example 1, 4.44 parts (0.015 mole) of octadecyl isocyanate was reacted with the polyurethane-urea-polymaine solution obtained therein, and then, 3.42 parts (0.037 mole) of epichlorohydrin was added to the reaction mixture and the reaction was conducted further at 50° C under agitation for 1 hour. Then, 4,50 parts (0.037 mole) of 1,3-propanesultone was added to the reaction mixture, and the reaction was carried out under vigorous agitation at 50° C for 2 hours to render the remaining amino groups amphoteric. Then, 600 parts of water was added to the reaction mixture. The solvent was removed at 60° C under reduced pressure, and water was added to the residue to adjust the concentration. Thus, there was obtained a low-viscosity stable aqueous emulsion having a resin content of 10%.

COMPARATIVE EXAMPLE 2

The polyurethane-urea-polyamine solution prepared as described in Example 1 was not reacted with octadecyl isocyanate as described in Example 1, but rather to it was added 4.81 parts (0.052 mole) of epichlorohydrin and the reaction mixture was reacted under agitation at 50° C for 1 hour. Then, 6.35 parts (0.052 mole) of 1,3-propanesultone was added to the reaction mixture. The reaction was carried out under vigorous agitation at 50° C for 2 hours to render the remaining amino groups amphoteric. Then 600 parts of water was added to the reaction mixture and the solvent was removed at 60° C under reduced pressure. Water was added to the residue to adjust the concentration. Thus, there was obtained a stable aqueous emulsion having a resin concentration of 10%.

EXAMPLE 4

4.81 parts of epichlorohydrin was added to the product obtained in Example 2 by reaction of the polyurethane-urea-polyamine with the alpha-olefin epoxide, and this reaction mixture was reacted at 50° C for 1 hour. Then, 1,3-propanesultone was reacted therewith in the same manner as described in Example 2. Water was added to the reaction mixture and the solvent was removed by distillation. Thus, there was obtained a stable emulsion having a resin content of 10%.

EXAMPLE 5

Property Tests of Fabrics Processed with Amphoteric Emulsions:

Each of the amphoteric emulsions prepared in the foregoing Examples 1 to 4 and Comparative Examples 1 and 2 can be applied to various kinds of fibers. In view of the compatibility with chemicals to be used therewith in combination and the synergistic effects attained by these chemicals in combination, the best results were generally obtained when these emulsions were applied to woven and knitted fabrics made of cellulose fibers.

The application of the emulsions to cotton fabrics will now be described by way of illustration.

PROCESSING OF COTTON NO. 40 BROADCLOTH

Processing Conditions (preparation of test cloth):

A sample cloth was dipped in an amphoteric urethane emulsion having a solid content of 0.5% and squeezed with a mangle to a squeezing ratio of about 70%. This means that the treated cloth contained impregnated therein an amount of the emulsion equal to 70% of the weight of the cloth prior to treatment. Then, the cloth was dipped in the emulsion again and squeezed with the mangle in the same fashion. Then, the cloth was dried for 3 minutes at 100° C by hot air and then heat-set at 150° C for 3 minutes to obtain a sample cloth which was then subjected to the following property tests.

Comparative test cloths were similarly prepared employing the emulsions prepared in Comparative Examples 1 and 2. These test cloths and an untreated cloth were subjected to the following property tests.

TEST METHODS AND EVALUATION

1. Crease Resistance:

According to the method of JIS L-1042, the opened angle of the test cloth was measured by a Monsanto type tester in both the warp and weft directions, and the crease resistance was evaluated based on the sum of the angles obtained with respect to the warp direction and to the weft direction. The measurement was conducted at a temperature of 25° C and a relative humidity maintained at 60%.

2. Softness:

The maximum bending load of the test cloth was determined with respect to both the warp direction and weft direction by using a Handle-o-meter (manufactured by Kumagaya Riki Kogyo K.K.), and the softness was evaluated based on the sum of the values obtained with respect to the warp direction and to the weft direction. A smaller value indicates a better softness.

3. Washing Condition:

The test cloths were washed with a 0.2% synthetic detergent bath under usual domestic washing condition at 40° C.

TEST RESULTS

The test results are shown in the following Table.

Table

| Treating Agent | Crease Resistance (°) (open angle) | | Softness (g) | |
|---|---|---|---|---|
| | as-finished | after 5 washings | as-finished | after 5 washings |
| Example 1 | 251 | 215 | 14.1 | 15.2 |
| Example 2 | 247 | 217 | 14.5 | 15.3 |
| Example 3 | 253 | 238 | 14.2 | 14.5 |
| Example 4 | 251 | 242 | 14.4 | 14.8 |
| Comparative Example 1 | 250 | 210 | 20.9 | 16.9 |
| Comparative Example 2 | 252 | 240 | 21.1 | 18.6 |
| Untreated Cloth | 162 | 165 | 15.8 | 15.5 |

The embodiments of the invention in which an exclusive property or privilege is claimed are defined as follows:

1. A process for preparing an amphoteric polyurethane aqueous emulsion, which comprises:
   1. reacting, in the liquid phase and in a ketone solvent, at a temperature of from −20° to +70° C, (A) isocyanate-terminated urethane prepolymer prepared by reacting organic polyol having a molecular weight in the range of from 200 to 10,000 with an excess of organic polyisocyanate, with (B) an excess of polyalkylene polyamine having at least two primary or secondary amino groups, the total mole number of primary and secondary amino groups in the polyalkylene polyamine being greater than the total mole number of isocyanate groups in the isocyanate-terminated urethane prepolymer, the reaction being carried out until the presence of —NCO groups cannot be detected, whereby to form polyurethane-urea-polyamine,
   2. reacting with the polyurethane-urea-polyamine of step 1, a substance selected from the group consisting of alkyl isocyanates having an alkyl group containing 12 to 22 carbon atoms and a α-olefin epoxides having from 12 to 22 carbon atoms, to form an alkyl-substituted polyurethane-urea-polyamine, the amount of said substance being from 10 to 80 mole %, based on the number of moles of amino groups in the molecule of said polyurethane-urea-polyamine,
   3. reacting the reaction product of step 2 with a material selected from the group consisting of β-propiolactone, δ-valerolactone, ε-caprolactone, 1,3-propane sultone and 1,4-butane sultone to render amphoteric the alkyl-substituted polyurethane-urea-polyamine, the amount of said material being from 0.5 to 2.0 moles per mole of amino groups in said alkyl-substituted polyurethane-urea-polyamine,
   4. treating the reaction product of step 3 to remove the solvent therefrom and adding water thereto to form an aqueous amphoteric polyurethane emulsion.

2. A process according to claim 1, in which the reactant (B) includes up to 50 percent, by molecular equivalent, of diamines or alkylene oxide adducts, acrylonitrile adducts or acrylate adducts of diamines.

3. A process according to claim 1, in which the ratio of (B) the total mole number of amino groups containing active hydrogen atoms in the polyalkylene polyamine to (A) the total mole number of isocyanate groups in said urethane prepolymer is in the range of 1 <B/A ≦ 5.

4. A process according to claim 3, in which said polyalkylene polyamine has the formula

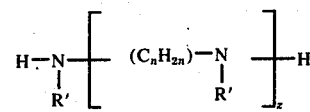

wherein n is an integer larger than one, z is an integer from 2 to 4 and R' is hydrogen, alkyl having one to 4 carbon atoms or hydroxyalkyl having one to 4 carbon atoms.

5. A process according to claim 4, in which in step 3 the reaction is carried out at 40° to 70° C for one to 7 hours.

6. A process according to claim 1, wherein the amount of said substance employed in step 2 is from 20 to 60 mole % based on the number of moles of amino groups in the molecule of the polyurethane-urea-polyamine.

7. A process according to claim 1, in which step 2 is carried out at a temperature of 10° to 70° C, for from 1 to 5 hours.

8. A process according to claim 1, in which between steps 2 and 3, the reaction product of step 2 is reacted with epichlorohydrin or epibromohydrin at 40° to 70° C, for 2 to 5 hours, in an amount equimolar to the primary and secondary amino groups in the molecule of the alkyl-substituted polyurethane-urea-polyamine.

9. An aqueous amphoteric polyurethane emulsion prepared by the process of claim 1.

10. A fibrous object having deposited thereon the solid components of the emulsion of claim 9.

* * * * *